US012137401B2

(12) United States Patent
Mishra et al.

(10) Patent No.: US 12,137,401 B2
(45) Date of Patent: Nov. 5, 2024

(54) METHOD AND APPARATUS FOR USER PLANE RESOURCE OPTIMIZATION

(71) Applicant: Mavenir Networks, Inc., Richardson, TX (US)

(72) Inventors: Abhishek Mishra, Bangalore (IN); Vipin Padlikar, Bangalore (IN); Rohit Gupta, Bangalore (IN); Tamanna Jindal, McKinney, TX (US)

(73) Assignee: Mavenir Networks, Inc., Richardson, TX (US)

( * ) Notice: Subject to any disclaimer, the term of this patent is extended or adjusted under 35 U.S.C. 154(b) by 363 days.

(21) Appl. No.: 17/736,413

(22) Filed: May 4, 2022

(65) Prior Publication Data

US 2022/0264419 A1 Aug. 18, 2022

Related U.S. Application Data

(63) Continuation of application No. PCT/US2019/059621, filed on Nov. 4, 2019.

(51) Int. Cl.
*H04W 40/02* (2009.01)
*H04W 40/24* (2009.01)
(Continued)

(52) U.S. Cl.
CPC ......... *H04W 40/02* (2013.01); *H04W 40/246* (2013.01); *H04W 40/26* (2013.01); *H04W 80/06* (2013.01)

(58) Field of Classification Search
CPC ... H04W 40/02; H04W 40/246; H04W 40/26; H04W 80/06; H04W 28/10; H04W 40/38; H04W 28/021; H04L 45/127; H04L 45/74
See application file for complete search history.

(56) References Cited

U.S. PATENT DOCUMENTS 11,452,148 B2 * 9/2022 Casati .................. H04W 76/11
2004/0156365 A1 8/2004 Suzuki et al.
(Continued)

FOREIGN PATENT DOCUMENTS

CN 110351777 A 10/2019
WO 2017170122 A1 10/2017
WO 2019078888 A1 4/2019

OTHER PUBLICATIONS

3GPP TS23.214 v.16.20 "3rd Generation Partnership Project; Technical Specification Group Services and Systems spects: Architecture Enhancements for Control and User Plane Separation of EPC Nodes; Sep. 2020; Stage 2; Release 16" (Year: 2020).*
(Continued)

*Primary Examiner* — Tejis Daya
(74) *Attorney, Agent, or Firm* — Ruggiero McAllister & McMahon LLC

(57) ABSTRACT

A combined User Plane (UP) node optimizes the UP data stream handling for 4G/5G network operation as follows. The combined UP node, which includes an access data plane node, an intermediate data plane node, an anchor data plane node, and a session handling process module. If the IP addresses or the namespaces of the access data plane node, the intermediate data plane node, and the anchor data plane node are different, then the downlink and uplink packet stream handling utilizes an intermediate interface path within the combined UP node. If the IP addresses or the namespaces of the access data plane node, the intermediate data plane node, and the anchor data plane node are same, then the downlink and uplink packet stream handling does not utilize an intermediate interface path within the combined UP node, but TEID of the unutilized intermediate interface path is used in PFCP response message.

20 Claims, 11 Drawing Sheets

(51) Int. Cl.
*H04W 40/26* (2009.01)
*H04W 80/06* (2009.01)

(56) References Cited

U.S. PATENT DOCUMENTS

| | | |
|---|---|---|
| 2014/0219249 A1 | 8/2014 | Keller et al. |
| 2015/0110095 A1* | 4/2015 | Tan ................ H04M 15/41 |
| | | 370/338 |
| 2016/0212638 A1 | 7/2016 | Jain et al. |
| 2022/0345881 A1* | 10/2022 | Tan ................ H04L 12/1407 |

OTHER PUBLICATIONS

International Preliminary Report on Patentability for corresponding international (PCT) application No. PCT/US2019/059621; 7 pages, dated May 10, 2022.

Chunduri et al. "Transport Network aware Mobility for 5G." In: DMM Working Group. Jul. 8, 2019 (Jul. 8, 2019).

Andres-Maldonado et al. "Narrowband IoT data transmission procedures for massive machine-type communications." In: IEEE Network. Nov. 27, 2017 (Nov. 27, 2017).

International Search Report for corresponding international (PCT) application No. PCT/US2019/059621; 2 pages, dated Jan. 14, 2020.

Written Opinion of the International Searching Authority for corresponding international (PCT) application No. PCT/US2019/059621; 6 pages, dated Jan. 14, 2020.

Extended European Search Report for corresponding European application No. 19952135 ; 8 pages, dated Jun. 30, 2023.

Homma et al "User Plane Protocol and Architectural Analysis on 3GPP SG System draft-ietf-dmm-Sg-uplane analysis-02" DMM Working Group, Internet Engineering Task Form, IETF, Jul. 8, 2019.

* cited by examiner

METHOD AND APPARATUS FOR USER PLANE RESOURCE OPTIMIZATION

CROSS REFERENCE TO RELATED APPLICATIONS

The present application is a continuation of International (PCT) Patent Application No.: PCT/US2019/59621 filed on Nov. 4, 2019, the entirety of which is incorporated by reference herein.

BACKGROUND OF THE DISCLOSURE

1. Field of the Disclosure

The present disclosure relates to a mobile communication network operation, and relates more particularly to a method and an apparatus for optimizing User Plane resource, e.g., for 4th-Generation (4G), 5th-Generation (5G) mobile network operations and combination ("Combo") nodes (where user plane mobile network resources of different generations are present as a single node).

2. Description of the Related Art

A User Plane (UP) node is a system node in a data path through which the data is transmitted to/from, e.g., a user equipment (UE) and the Internet. In 4G, a UP node can be Serving Gateway User Plane (SGW-U), Packet Gateway User Plane (PGW-U) and/or Traffic Detection Function User Plane function (TDF-U). In 5G, a UP node is a User Plane function (UPF) node.

FIG. 1 illustrates the 4G system architecture defined by Technical Specification TS 23.214, in which architecture the Control Plane (CP), i.e., the part of the network that carries signaling traffic, is separate from the UP. In FIG. 1, Serving Gateway Controller (SGW-C), Packet Gateway Controller (PGW-C) and Traffic Detection Function Controller (TDF-C) are the CP entities or nodes, and the SGW-U, PGW-U and TDF-U are the UP entities or nodes. As shown in FIG. 1, the CP nodes and UP nodes are connected through Sxa, Sxb and Sxc interfaces.

FIG. 2a illustrate the 5G system architecture counterpart to the 4G system architecture shown in FIG. 1, which 5G system is shown as serving a user equipment (UE). In FIG. 2a, the CP nodes are the various Session Management Function (SMF) nodes (e.g., SMF1, SMF 2 and SMF3), and the UP nodes are the various UPF nodes, which include three types: Intermediate UPF (I-UPF), Packet Data Unit Session Anchor (PSA) (two different PSAs are shown in FIG. 2a, i.e., PSA1 and PSA2), and Uplink Classifier/Branching Point (ULCL/BP). The CP and UP nodes are connected through N4 interfaces.

FIG. 2b illustrates a more detailed system configuration of 5G system, which has defined network function (NF) and architecture that support service-based architecture (SBA). FIG. 2b shows an example embodiment of the service-based architecture, which includes: User Plane Function (UPF) module; Network Repository Function (NRF) module (e.g., utilizing associated interface Nnrf); Data Network (DN); User Equipment (UE); Radio Access Network (RAN); Authentication Server Function (AUSF) module (e.g., utilizing associated interface Nausf); Access and Mobility Management Function (AMF) module (e.g., utilizing associated interface Namf); Application Function (AF) module (e.g., utilizing associated interface Na); Network Exposure Function (NEF) module (e.g., utilizing associated interface Nnef); Network Slice Selection Function (NSSF) module (e.g., utilizing associated interface Nnssf); Policy Control Function (PCF) module (e.g., utilizing associated interface Npcf); Session Management Function (SMF) module (e.g., utilizing associated interface Nsmf); and Unified Data Management (UDM) module (e.g., utilizing associated interface Nudm). The above-mentioned NFs (e.g., UPF, NRF, SMF, etc.) can be implemented, e.g., as software programs executed by computer processors.

NRF module can be a network entity that supports NF registration, NF discovery and Subscribe/Notification services. In an example embodiment, any NF can register with the NRF module by using the service-based interfaces. Any NF node can perform the discovery of another NF node by doing subscribe-and-receive-notification about the given NF node.

User Plane Function (UPF) (also referred to as Data Plane Function (DPF)) on 5G is a network function, which is used for routing user plane traffic. Unlike other NF, UPF can offer one or more of different services to the user plane traffic, e.g., a Branching Point (BP), Uplink Classifier (ULCL), Anchor Point (e.g., Packet Data Unit Session Anchor (PSA)), Deep Packet Inspection (DPI) and/or Intermediate User Plane Function (I-UPF), which are merely examples and are not limiting. Branching Point refers to a common UPF at which the different user plane paths leading to the different PDU anchors branch out, and this common UPF is referred to as a UPF supporting the "Branching Point" functionality. Uplink Classifier (ULCL) function aims to direct network data traffic to local data networks based on traffic-matching-filters applied to the UE data traffic. I-UPF refers to an intermediate UPF that sits between two other UPFs. PSA is an UPF that anchors with the Data Network (DN). DPI is a functionality that performs the Layer 7 packet inspection, e.g., identifying a Skype™-like application.

SUMMARY OF THE DISCLOSURE

FIG. 3 illustrates a system architecture (e.g., for serving a UE) which is valid for both 4G and 5G systems. The different UP entities (Intermediate Data plane node 301, Access Data plane node 302 and/or Anchor Data Plane Nodes 1 and 2, designated as 303a and 303b, respectively) can be in separate nodes or in a combined UP node 31. Similarly, the counterpart CP entities (e.g., CP1 304, CP2 305, and CP3 306) can be separate nodes (as shown in FIG. 3) or combined in a single CP node. When the CP entities are in separate nodes and the UP entities are in one combined node, a problem exists in that the technical specifications for the 4G and 5G systems do not specify how to achieve the user plane traffic stream optimization.

An example embodiment of the present disclosure provides a combined UP node which is configured to achieve user plane traffic stream optimization while minimizing the number of expensive interface resources.

An example embodiment of the present disclosure provides a method of operating a combined UP node which is configured to achieve user plane traffic stream optimization while minimizing the number of expensive interface resources.

In the example embodiment shown in FIG. 3, there is no need to use (and/or provide) connecting circuits i) between Anchor Data Plane Node 1 303a and Intermediate Data Plane Node 301, and ii) between Intermediate Data Plane Node 301 and Access Data Plane Node 302, for a user plane session with Service 1 307. Similarly, in the example embodiment shown in FIG. 3, there is no need to use (and/or provide) connecting circuits between Anchor Data Plane Node 2 303b and Access data Plane Node 302 for a user plane session with Service 2 node 308. The downlink user data traffic for Service 1 307 can go directly by entering the combined UP node 31 at Anchor Data Plane Node 1 303a via circuit a, subjected to the processing as per the rules specified by CP (e.g., CP1-CP3 304-306), and then can go out from the combined UP node 31 through the circuit f to Radio Access Network (RAN) 309. The downlink user data traffic for Service node 2 308 can go directly by entering the combined UP node 31 at Anchor Data Plane Node 2 303b via circuit d, subjected to the processing as per the rules specified by CP (e.g., CP1 304), and then can go from the combined UP node 31 through the circuit f to RAN 309.

Similarly, the uplink user data traffic from RAN 309 for Service node 1 307 can go directly by entering the combined UP node 31 at Access Data Plane Node via circuit f, subjected to the processing as per the rules specified by CP (e.g., CP1-CP3 304-306), and then can go out from the combined UP node 31 through the circuit a to Service node 1 307. The uplink user data traffic from RAN 309 for Service node 2 308 can go directly by entering the combined UP node 31 at Access Data Plane Node 302 via circuit f, subjected to the processing as per the rules specified by CP (e.g., CP1 304), and then can go out from the combined UP node 31 through the circuit d to Service node 2 308.

The combined UP (e.g., combine UP node 31) eliminates the need for multiple intermediate circuits (e.g., circuits b, c and e shown in FIG. 3), which are expensive, even though the separate CP (e.g., CP1-CP3 304-306) will presume that those circuits exist, and the UP node utilizes the Terminal Endpoint Identifiers (TEIDs) associated with the intermediate circuits (which do not actually exist and are not used) in Packet Forwarding Control Protocol (PFCP) response messages.

The combined UP has multiple processes, e.g., logging, alarms and session management process. The session management process listens on the specific port for getting the messages from the different CP entities. Since the CP entities are on different nodes, they do not know whether the Access Data Plane Node, Intermediate Data Plane Node or Anchor Data Plane nodes are on the same combined UP node or are configured as separate nodes. In accordance with the example embodiments disclosed herein, the combined UP (e.g., using a session handling process module 310 incorporated as a part of the combined UP) makes the decision whether the intermediate circuits should be bypassed or not.

DETAILED DESCRIPTION OF THE EMBODIMENTS

Figure 1:
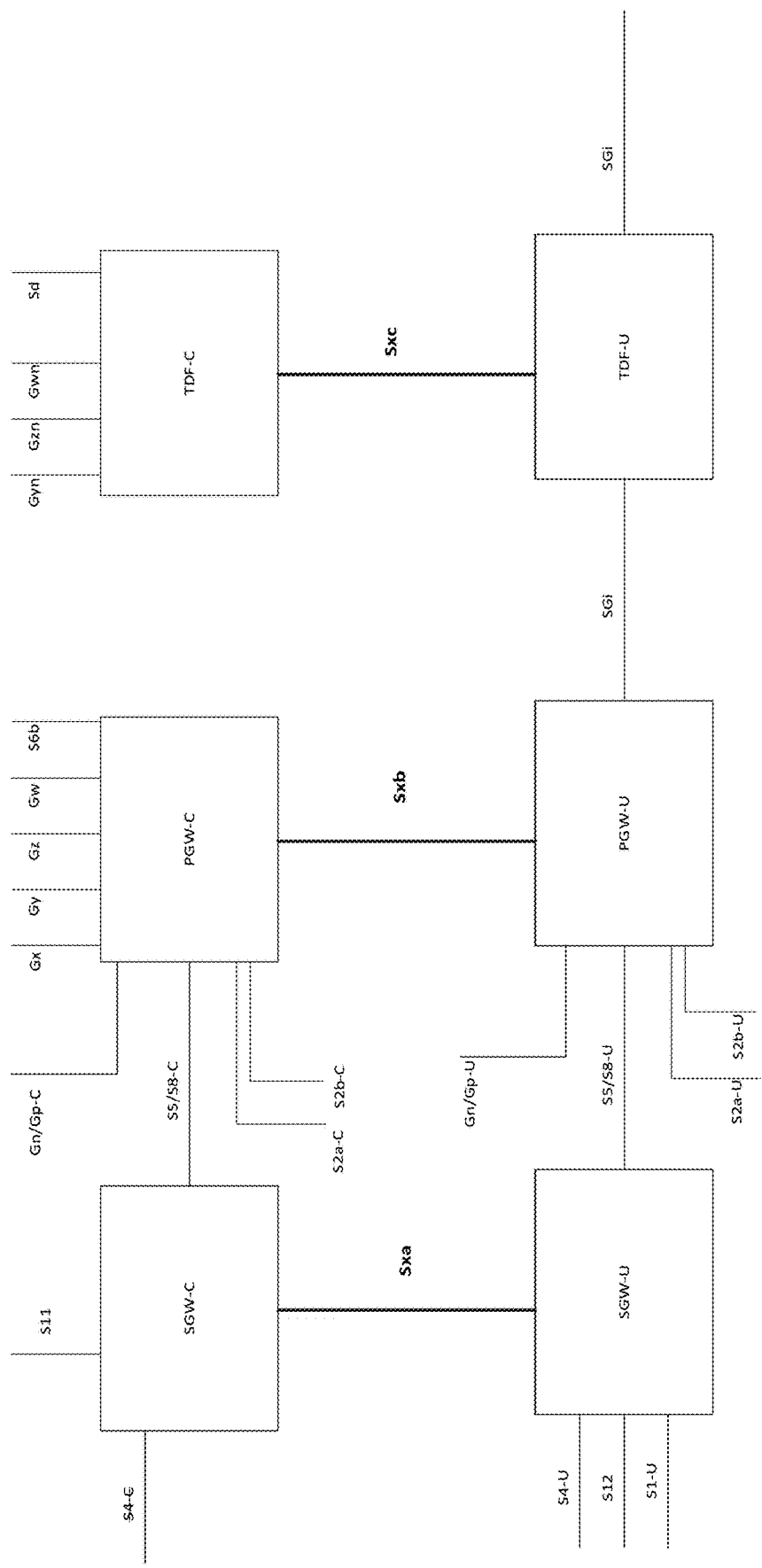
FIG. 1 illustrates an example of a 4G system architecture.
Figure 2A:
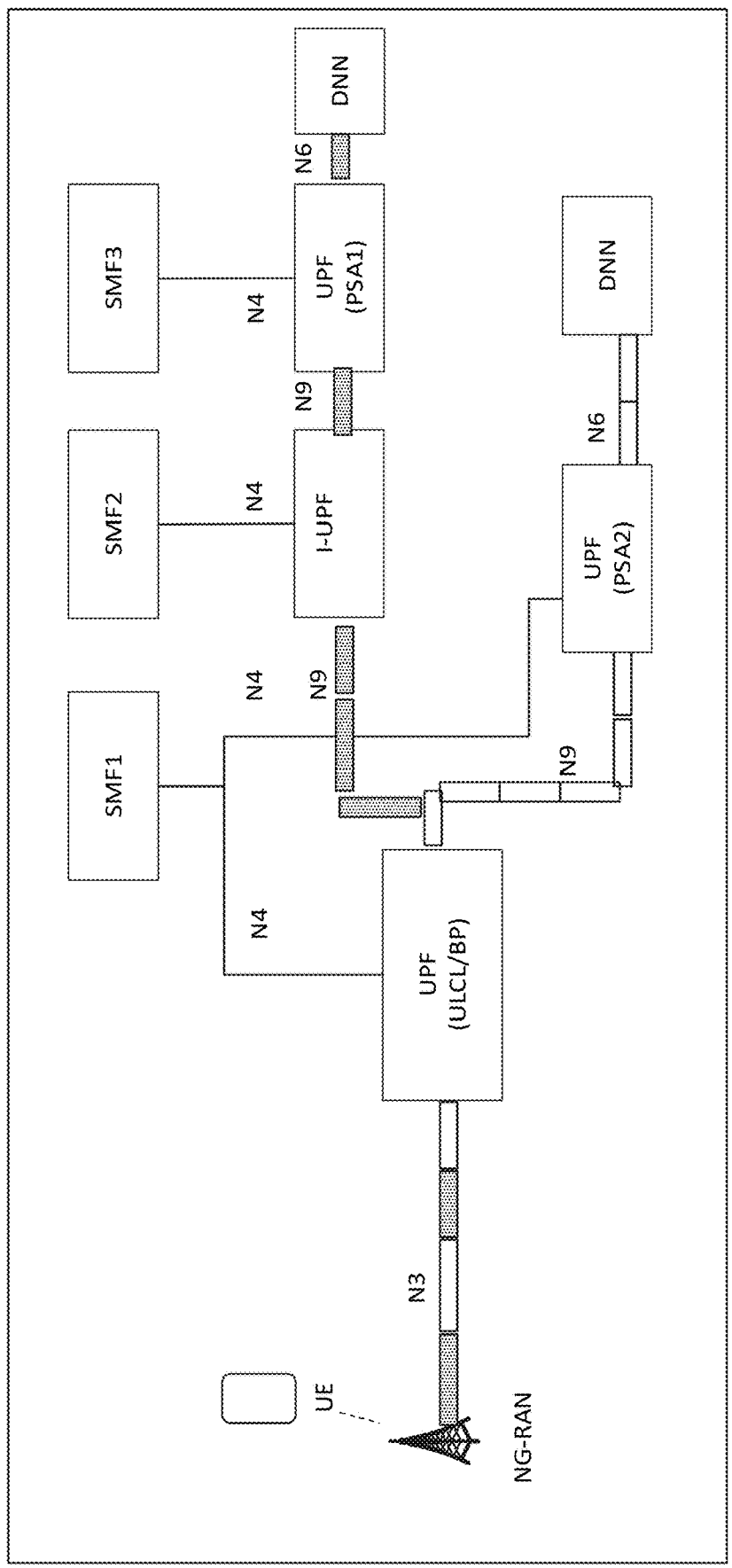
FIG. 2a illustrates an example 5G system architecture.
Figure 2B:
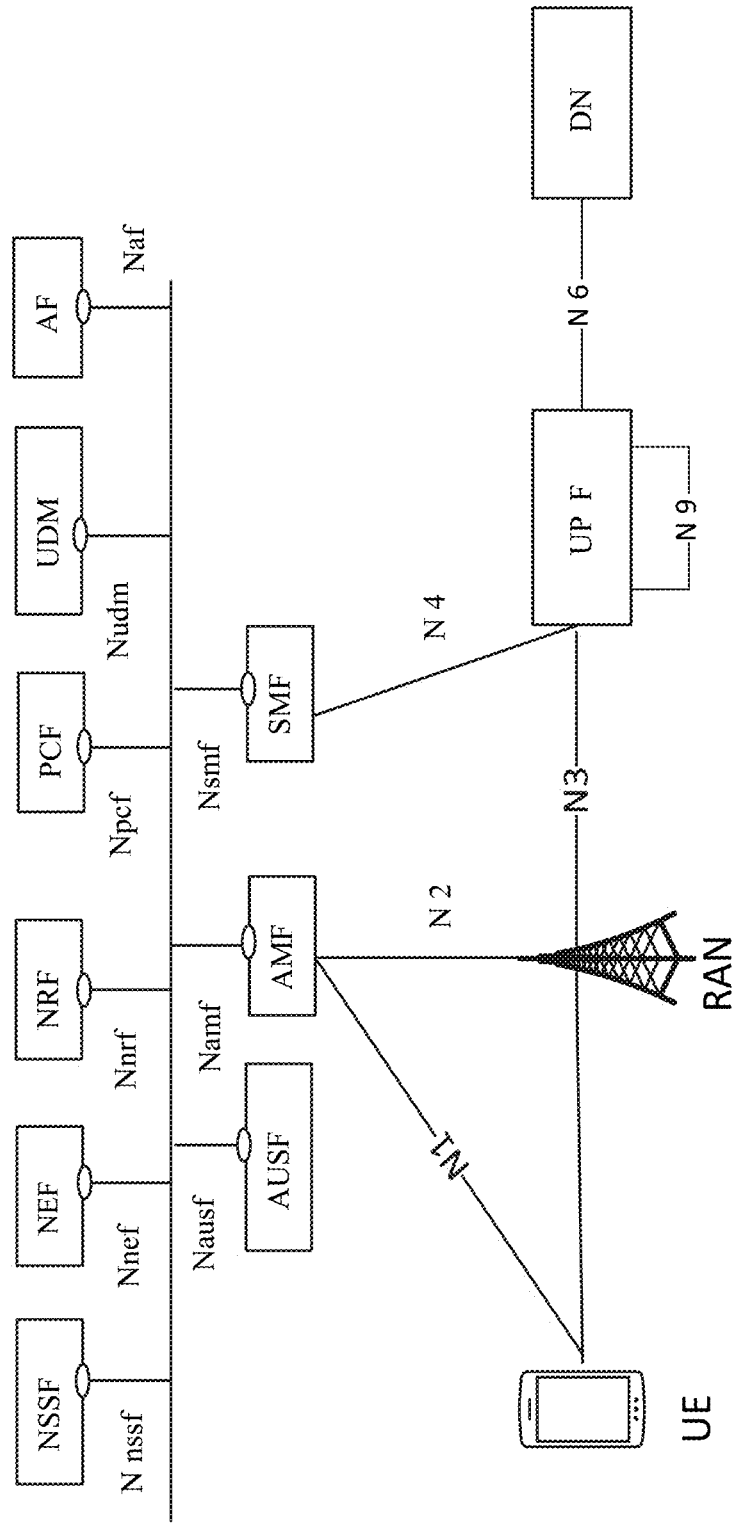
FIG. 2b illustrates a more detailed system configuration of a 5G system architecture.
Figure 3:
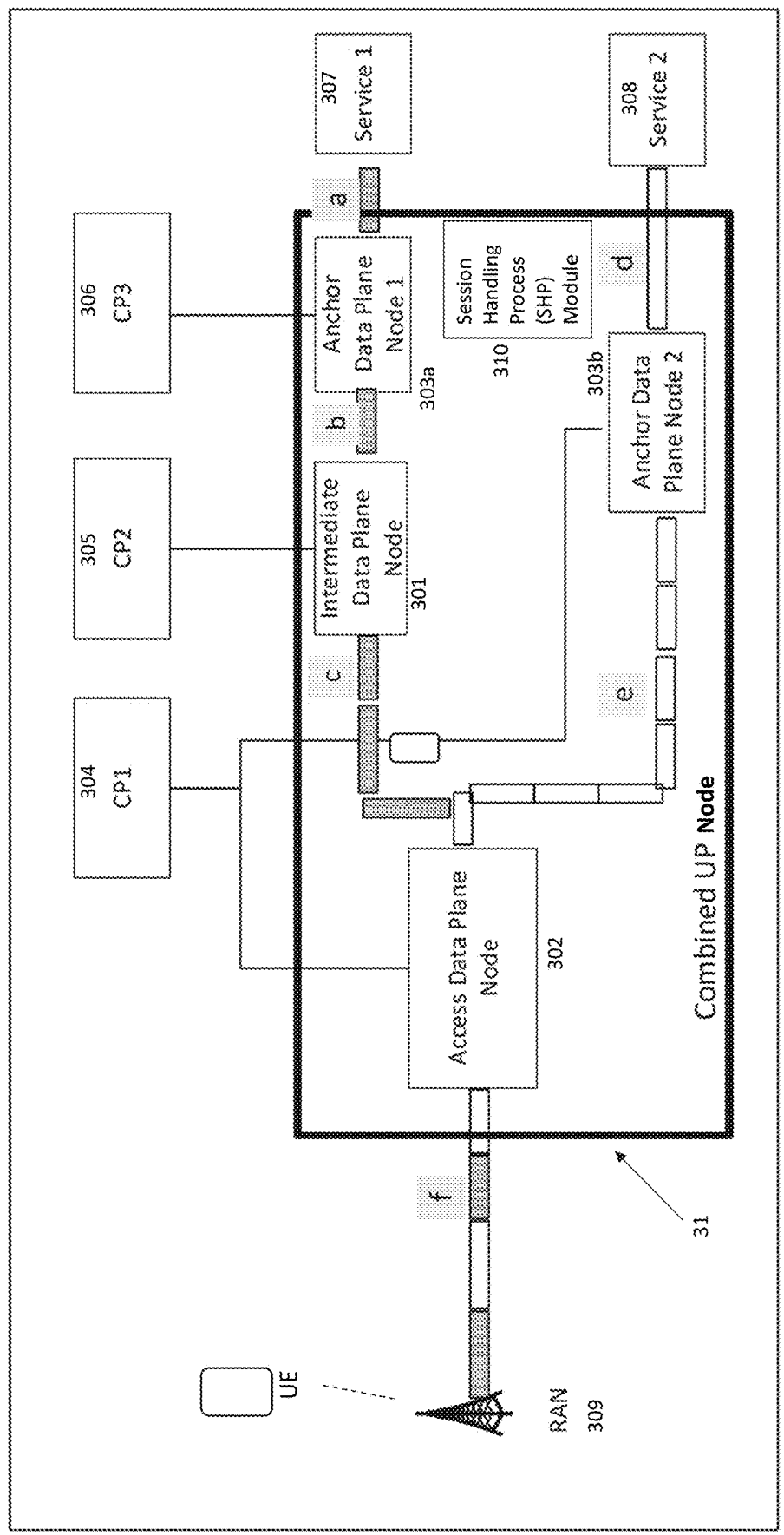
FIG. 3 illustrates a system architecture which is valid for both 4G and 5G systems.

The example embodiment of the combined UP node 31 shown in FIG. 3 includes, e.g., the Access Data Plane Node 302 (which connects to the RAN), Intermediate Data Plane Node 301 (which connects to the Anchor Data Plane Nod 1 303a and the Access Data Plane Node 302), Anchor Data Plane Node 1 303a (which connects to Service 1 node 307, e.g., in the Internet), Anchor Data Plane Node 2 303b (which connects to Service 2 node 308, e.g., in the Internet), and a session handling process (SHP) module 310. In FIG. 3, because the CP entities (or nodes) CP1 304, CP2 305, and CP3 306 are in separate nodes, these CPs do not know whether the Access Data Plane Node 302, Intermediate Data Plane Node 301, Anchor Data Plane Node 1 303a and/or Anchor Data Plane Node 2 303b are on the same combined UP node or are configured as separate nodes. In the example embodiment shown in FIG. 3, the session handling process module 310 optimizes the user plane data stream handling for at least one of a 4G and 5G network operation in the following manner.

The session handling process module 310 ascertains Internet Protocol (IP) addresses and/or namespaces of the Access Data Plane Node 302, Intermediate Data Plane Node 301, Anchor Data Plane Node 1 303a (for a session with Service 1 307) and/or Anchor Data Plane Node 2 303b (for a session with Service 2 308) corresponding to assigned Tunnel Endpoint Identifier (TEIDs) for a Packet Forwarding Control Protocol (PFCP) session. If the IP addresses or the namespaces of the access data plane node 302, the intermediate data plane node 301, and the anchor data plane node (303a for a session with Service 1 307; 303b for a session with Service 2 308) are different, the downlink and uplink connections are handled in the following manner. For a downlink connection between a service node (e.g., Service 1 307 or Service 2 308) and a Radio Access Network (RAN) (e.g., 309), packets transmitted by a first interface (e.g., interface a for a session with Service 1 307; interface d for a session with Service 2 308) directly connecting the service node to the combined UP node 31 are routed to a second interface (e.g., interface b or c for a session with Service 1 307; interface e for a session with Service 2 308) located internally within the combined UP node 31, and the second interface maps the packets to at least one Tunnel Endpoint Identifier (TEID) associated with at least one third interface (interface f) directly connecting the combined UP node 31 to the RAN 309. For an uplink connection between the RAN 309 and the service node (e.g., 307 or 308), packets transmitted by the at least one third interface (interface f) directly connecting the RAN 309 to the combined UP node 31 are routed to the second interface (e.g., interface b or c for a session with Service 1 307; interface e for a session with Service 2 308) located internally within the combined UP node 31, and the second interface maps the packets to the first interface (e.g., interface a for a session with Service 1 307; interface d for a session with Service 2 308) directly connecting the combined UP node to the service node.

If the IP addresses or the namespaces of the access data plane node 302, the intermediate data plane node 301, and the anchor data plane node (303a for a session with Service 1 307; 303b for a session with Service 2 308) are the same, the downlink and uplink connections are handled in the following manner. For a downlink connection between a service node (e.g., Service 1 307 or Service 2 308) and a Radio Access Network (RAN) (e.g., 309), packets transmitted by a first interface (e.g., interface a for a session with Service 1 307; interface d for a session with Service 2 308) directly connecting the service node to the combined UP node 31 are routed directly to the at least one third interface (interface f) directly connecting the combined UP node 31 to the RAN, and the combined UP node 31 stores (e.g., at the session handling process module 310) at least one TEID of an intermediate path not utilized for the downlink connection (e.g., interface b or c for a session with Service 1 307; interface e for a session with Service 2 308). For an uplink connection between the RAN 309 and the service node (e.g., 307 or 308), packets transmitted by the at least one third interface (interface f) directly connecting the RAN 309 to the combined UP node 31 are routed directly to the first interface (e.g., interface a for a session with Service 1 307; interface d for a session with Service 2 308) directly connecting the combined UP node 31 to the service node, and the combined UP node 31 stores (e.g., at the session handling process module 310) at least one TEID of an intermediate path not utilized for the uplink connection (e.g., interface b or c for a session with Service 1 307; interface e for a session with Service 2 308).

Figure 4:
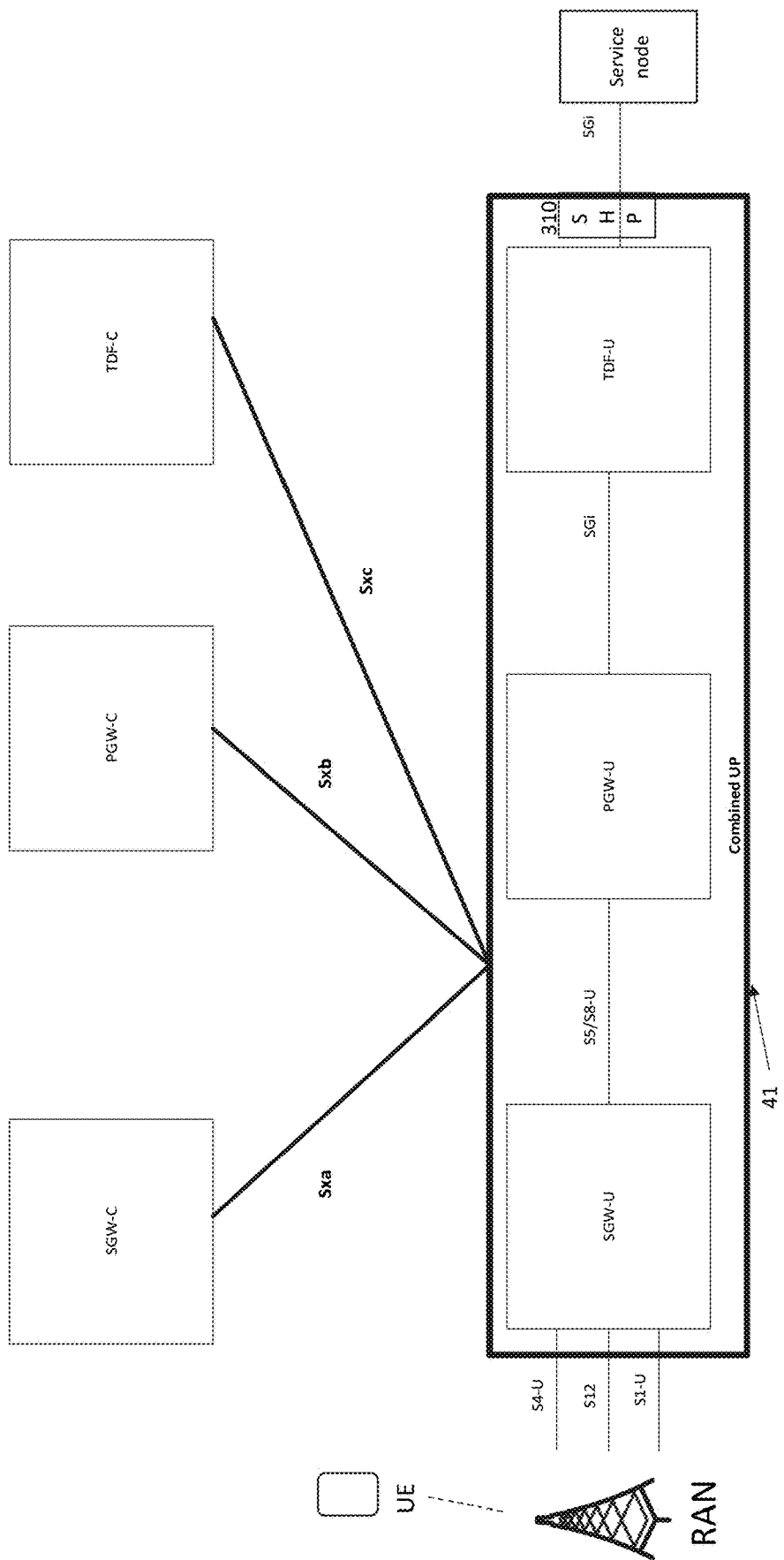
FIG. 4 illustrates an example of 4G system architecture including a combined UP node.

FIG. 4 illustrates an example of 4G architecture (e.g., for serving a UE) in which CP entities (Serving Gateway Controller (SGW-C), Packet Gateway Controller (PGW-C), and Traffic Detection Function Control plane function (TDF-C)) are in different nodes, and the UP entities (SGW-U, PGW-U, and TDF-U) are in a single, combined UP node 41, for which configuration the 4G technical specifications do not specify how to optimize the user plane traffic stream. In the example shown in FIG. 4, the combined UP node 41 is shown as including the intermediate interface circuits (or paths), e.g., S5-U and/or S8-U interface path between the SGW-U and the PGW-U, and the SGi interface path between the PGW-U and the TDF-U. However, since different UP entities (SGW-U, PGW-U, and TDF-U) are in a single, combined UP node 41, the downlink user traffic can be routed directly through SGi interface entering the combined UP 41 (e.g., at TDF-U), subjected to the processing as per the rules specified by the different CP entities (SGW-C, PGW-C, and TDF-C) and installed over Sxa, Sxb and Sxc interfaces, and then can be routed through the S1-U, S12 or S4-U interfaces to the RAN, without going through the intermediate interface paths. Similarly, the uplink traffic can go through the S1-U, S12 or S4-U interfaces, subjected to the processing as per the rules specified by the different CP entities (SGW-C, PGW-C, and TDF-C) and installed over Sxa, Sxb and Sxc interfaces, and then can be routed through the SGi interface.

Figure 5:
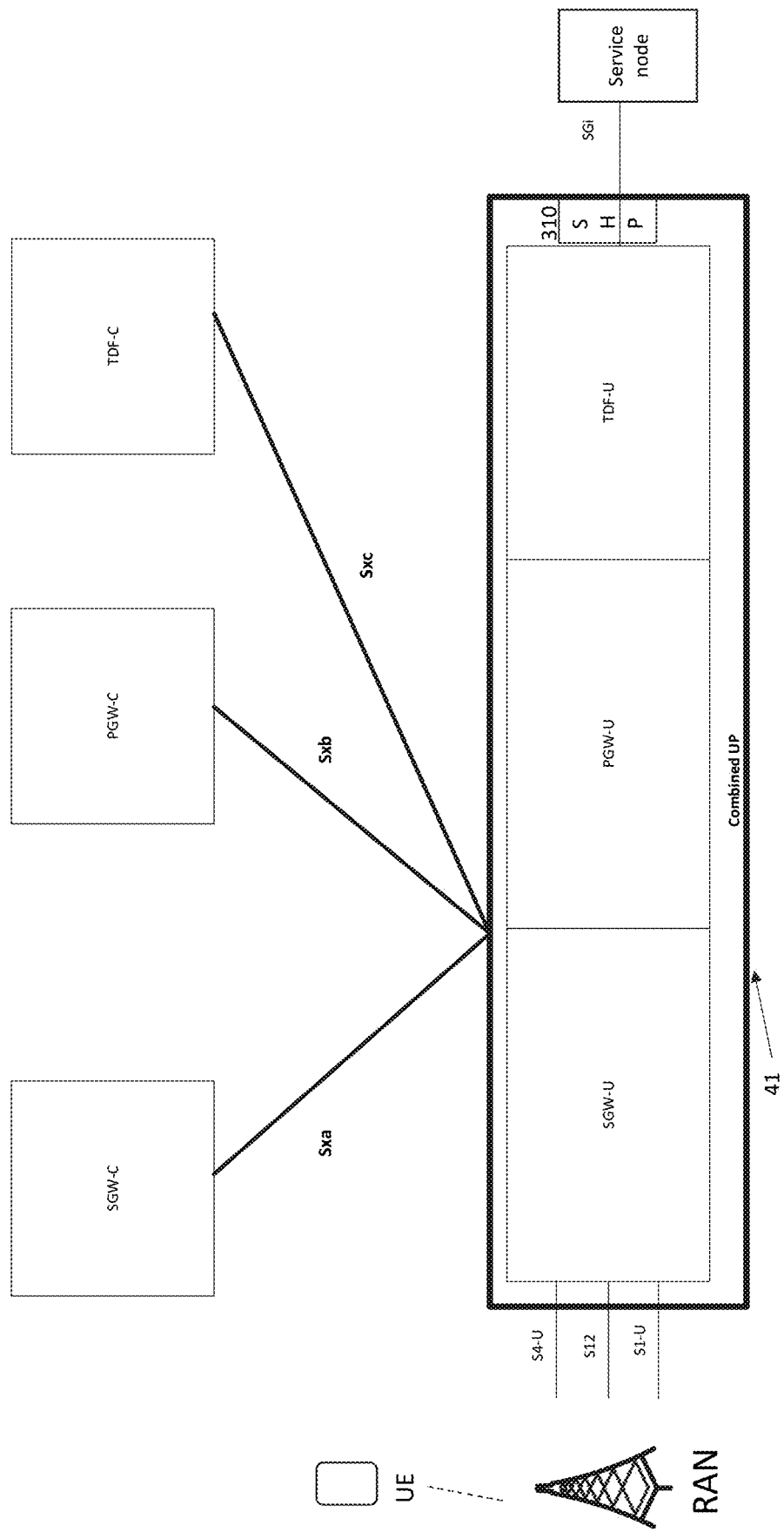
FIG. 5 illustrates another example of 4G system architecture including a combined UP node.

FIG. 5 illustrates an example of a combined UP node 41 in 4G architecture (e.g., for serving a UE), which combined UP node 41 optimizes the user plane data stream handling. In this example embodiment, the combined UP node 41 eliminates the intermediate interface circuits, i.e., S5-U and/or S8-U circuits and the SGi circuit, which are expensive. The downlink user traffic is routed directly through SGi interface entering the combined UP 41 (e.g., at TDF-U), subjected to the processing as per the rules specified by the different CP entities (SGW-C, PGW-C, and TDF-C) and installed over Sxa, Sxb and Sxc interfaces, and then routed through the S1-U, S12 or S4-U interfaces to the RAN, without going through the intermediate interface paths. Similarly, the uplink user plane traffic is routed through the S1-U, S12 or S4-U interfaces, subjected to the processing as per the rules specified by the different CP entities (SGW-C, PGW-C, and TDF-C) and installed over Sxa, Sxb and Sxc interfaces, and then routed through the SGi interface. In this example embodiment, the separate CPs (e.g., SGW-C, PGW-C and TDF-C) will presume that the intermediate interface paths or circuits (e.g., S5-U and/or S8-U interface path between the SGW-U and the PGW-U, and the SGi interface path between the PGW-U and the TDF-U) exist, and the combined UP node 41 utilizes the Terminal Endpoint Identifiers (TEIDs) associated with the intermediate paths (which are not actually provided and used in user plane data stream handling in this example) in Packet Forwarding Control Protocol (PFCP) response messages.

Figure 6:
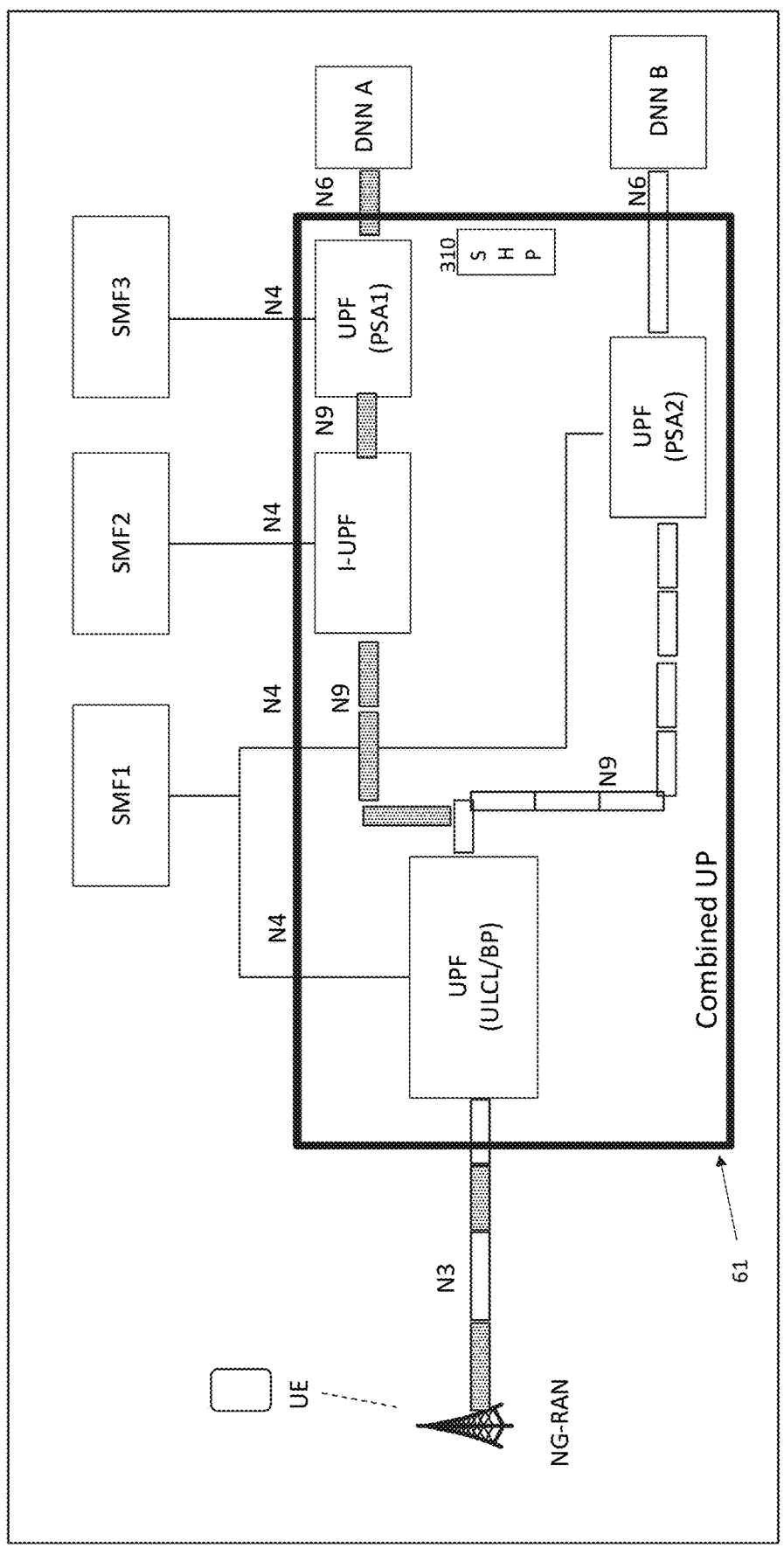
FIG. 6 illustrates an example of 5G system architecture including a combined UP node.

FIG. 6 illustrates an example of 5G architecture (e.g., for serving a UE) in which CP entities (Session Management Functions (SMFs) 1, 2 and 3) are in different nodes, and the UP entities (Access Data Plane Node being ULCL and/or BP; Intermediate Data Plane Node being I-UPF; and Anchor Data Plane Node being PSA1 and/or PSA2) are in a single, combined UP node 61, for which configuration the 5G technical specifications do not specify how to optimize the user plane traffic stream. In the example shown in FIG. 6, the combined UP node 61 is shown as including the intermediate interface circuits (or paths), e.g., N9 interface circuits shown connecting PSA1, I-UPF, ULCL/BP, and PSA2). However, since different UP entities (ULCL/BP, I-UPF, PSA1 and PSA2) are in a single, combined UP node 61, the downlink user traffic can be routed directly through the N6 interface entering the combined UP node 61, subjected to the processing as per the rules specified by the different CP entities (SMF 1, SMF2 and SMF 3) and installed over N4 interfaces, and then routed through the N3 interface to the RAN, without going through the intermediate interfaces. Similarly, the uplink user plane traffic is routed through the N3 interface, subjected to the processing as per the rules specified by the different CP entities (SMF 1, SMF2 and SMF 3) and installed over the N4 interface, and then routed through the N6 interfaces to Data Network Name (DNN) A and/or DNN B.

Figure 7:
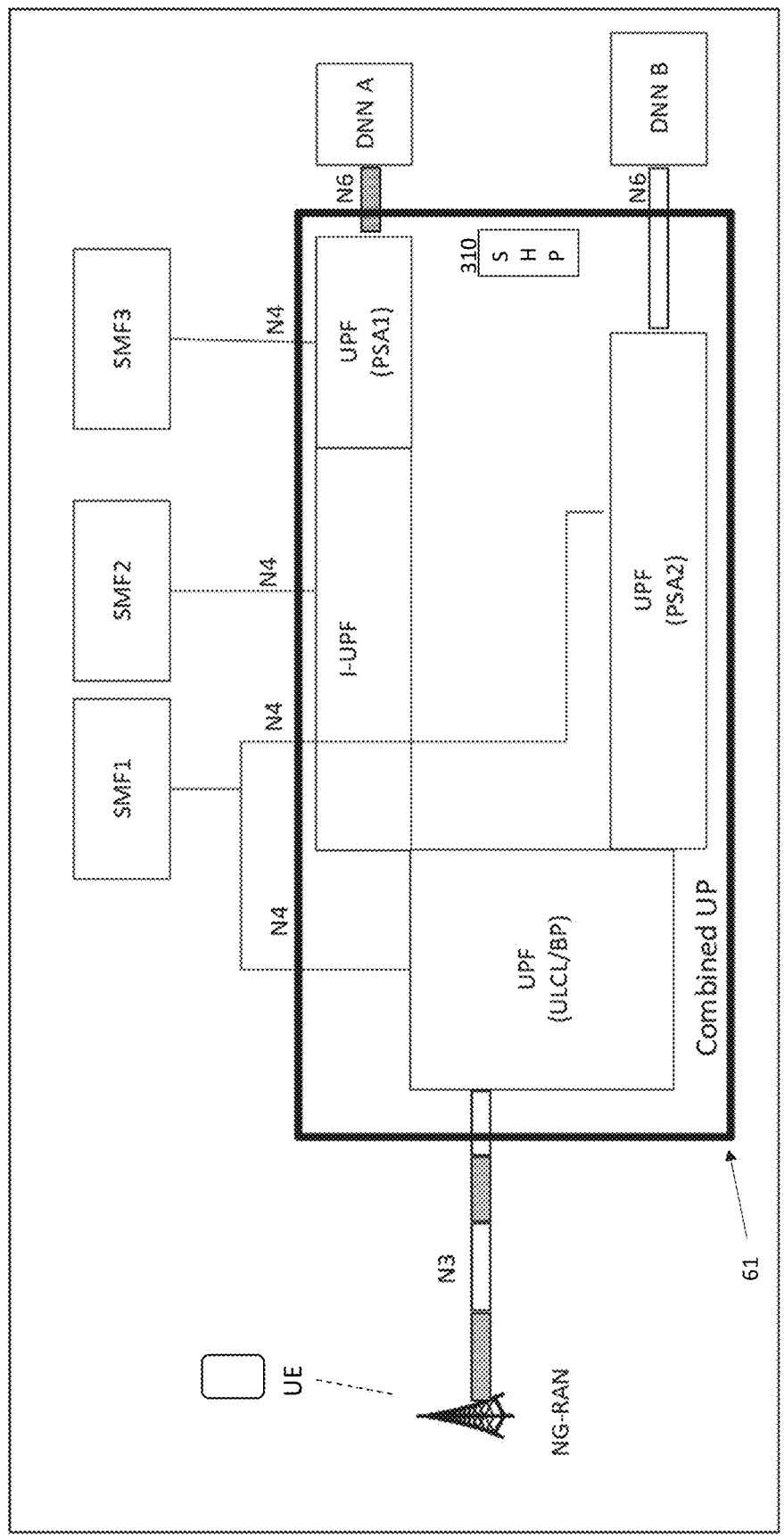
FIG. 7 illustrates another example of 5G system architecture including a combined UP node.

FIG. 7 illustrates an example of a combined UP node 61 in 5G architecture (e.g., for serving a UE), which combined UP node 61 optimizes the user plane data stream handling. In this example embodiment, the combined UP node 61 eliminates the intermediate interface circuits, i.e., N9 interface circuits shown connecting PSA1, I-UPF, ULCL/BP, and PSA2. The downlink user traffic is routed directly through the N6 interface entering the combined UP node 61, subjected to the processing as per the rules specified by the different CP entities (SMF 1, SMF2 and SMF 3) and installed over N4 interfaces, and then routed through the N3 interface to the RAN, without going through the intermediate interfaces. Similarly, the uplink user plane traffic is routed through the N3 interface, subjected to the processing as per the rules specified by the different CP entities (SMF 1, SMF2 and SMF 3) and installed over the N4 interface, and then routed through the N6 interfaces to Data Network Name (DNN) A and/or DNN B. In this example embodiment, the separate CPs (e.g., SMF 1, SMF2 and SMF 3) will presume that the intermediate interface paths or circuits (e.g., N9 interface circuits) exist, and the combined UP node 61 utilizes the Terminal Endpoint Identifiers (TEIDs) associated with the intermediate paths (which are not actually provided and used in user plane data stream handling in this example) in Packet Forwarding Control Protocol (PFCP) response messages.

Figure 8:
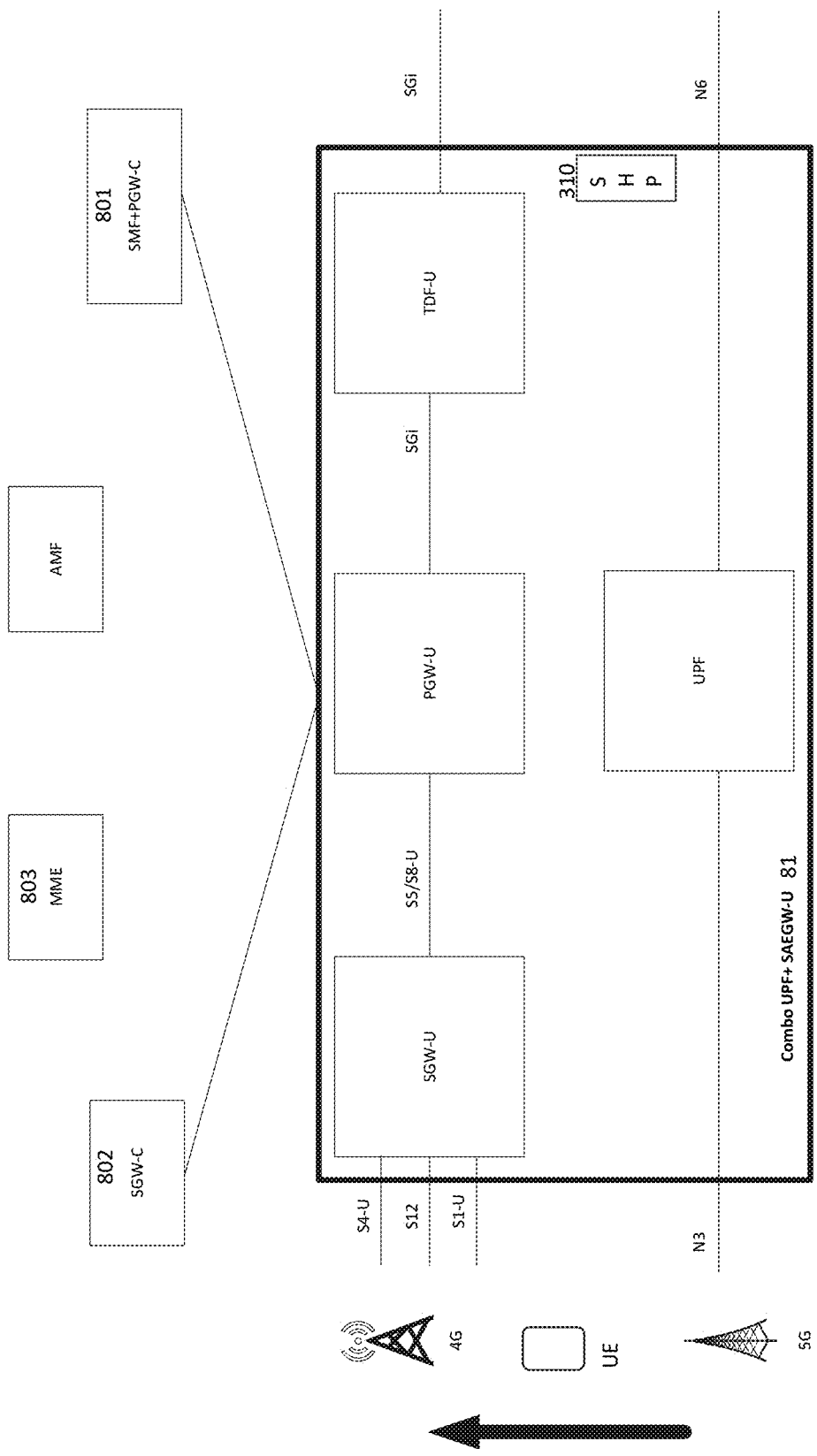
FIG. 8 illustrates an example handover from a 5G system to a 4G system.

FIG. 8 illustrates a handover from a 5G system to a 4G system, where SMF is also functioning as PGW-C (i.e., SMF+PGW-C node 801). In FIG. 8, the CP entities are in different nodes, and the UP entities are shown within a combined UP node (the "combo UPF+SAEGW-U" node) 81, "SAEGW-U" being an acronym for System Architecture Evolution Gateway User Plane. In this example, the combined UP node 81 is shown as including SGW-U, PGW-U and TDF-U for 4G, and UPF for 5G. Although both 4G and 5G UP entities are shown as included in the same UP node 81, this is purely an example, and the 4G UP entities may be in a node different from the 5G UP node. In the example shown in FIG. 8, the Mobility Management Entity (MME) node 803 has selected a SGW-C node 802, which in turn has selected the same PGW-U as the PGW-U controlled by the SMF+PGW-C node 801. In this case, there are two CP entities (or nodes), i.e., SGW-C node 802 and SMF+PGW-C node 801, that are controlling the same UP node, and the number of intermediate interface circuits or paths (i.e., SGi interface between PGW-U and TDF-U, and S5-U and/or S8-U interface between SGW-U and PGW-U) are unnecessarily created as shown in FIG. 8.

Figure 9:
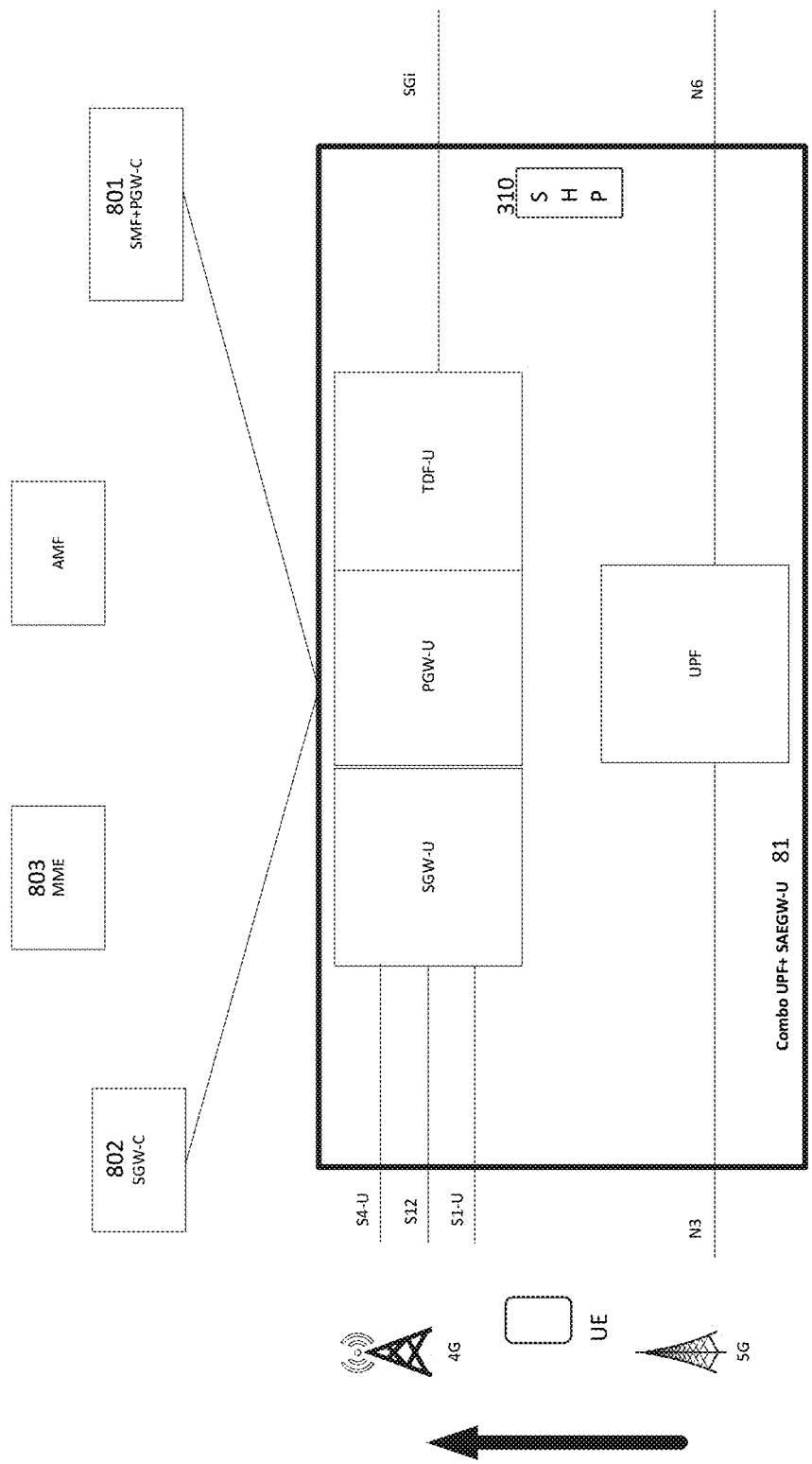
FIG. 9 illustrates another example handover from a 5G system to a 4G system.

FIG. 9 illustrate a handover from a 5G system to a 4G system, similar to the configuration shown in FIG. 8, but with optimized user plane data stream handling. As shown in FIG. 9, the downlink user traffic can be routed directly through the SGi interface entering the TDF-U for 4G, subjected to the processing as per the rules specified and/or installed by the CP entities, and then routed through the S1-U, S12 or S4-U interfaces, as shown in FIG. 9. Similarly, the uplink user plane traffic is routed through the S1-U, S12 or S4-U interfaces for 4G, subjected to the processing as per the rules specified and/or installed by the CP entities, and then routed through the SGi interface. In this manner, the UP dispenses with the intermediate interface circuits, e.g., S5-U and/or S8-U interface circuit between the SGW-U and the PGW-U, and the SGi interface circuit between the PGW-U and TDF-U, thereby achieving optimized user plane data stream handling and cost savings. However, the CP entities will presume that the S5-U/S8-U and SGi intermediate interface circuits exist, and the combined UP node 81 utilizes the Terminal Endpoint Identifiers (TEIDs) associated with the intermediate paths (which are not actually provided and used in user plane data stream handling in this example) in Packet Forwarding Control Protocol (PFCP) response messages.

Figure 10:
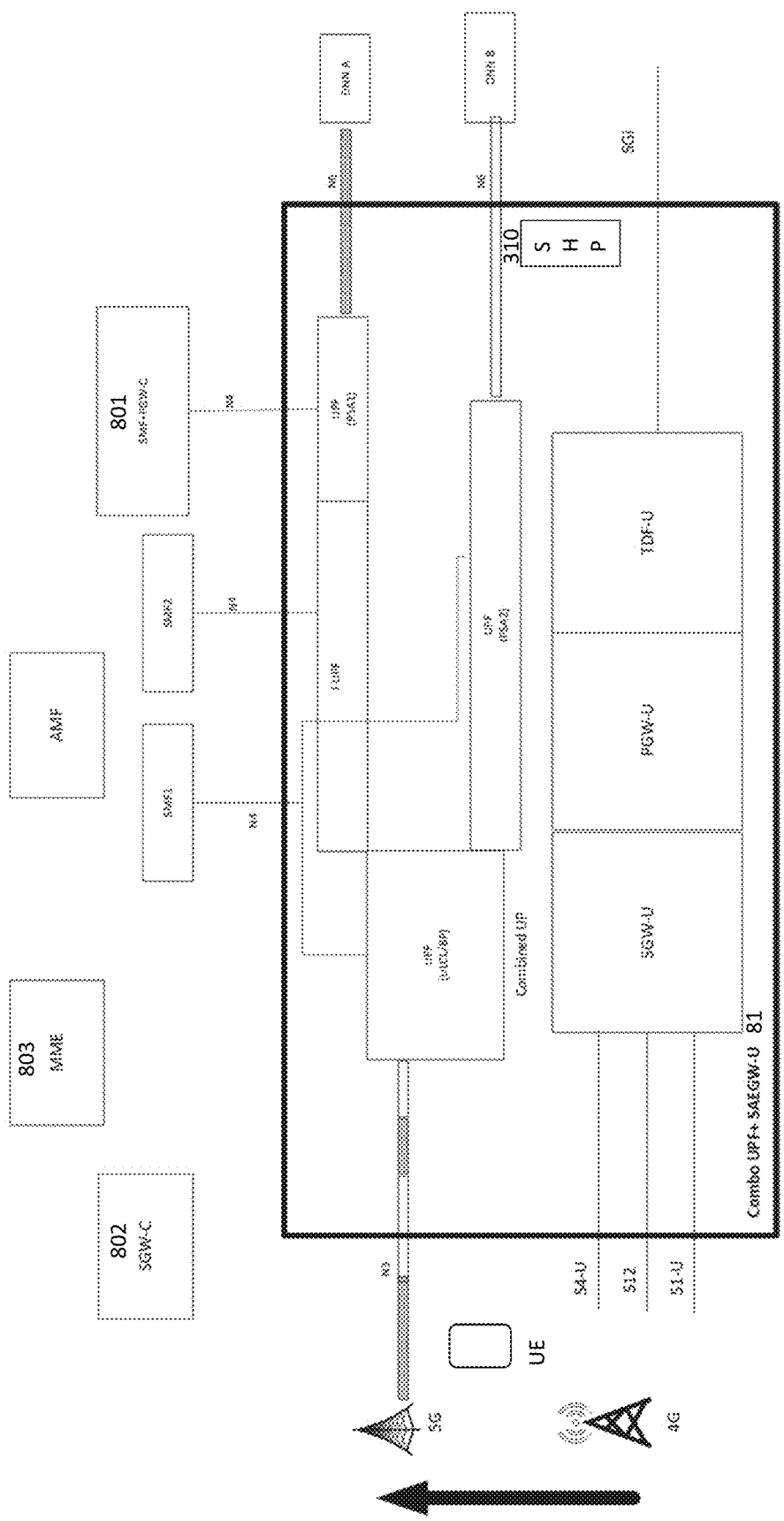
FIG. 10 illustrates an example handover from a 4G system to a 5G system.

FIG. 10 illustrates a handover from a 4G system to a 5G system, where SMF is also functioning as PGW-C (i.e., SMF+PGW-C node 801). In FIG. 8, the CP entities are in different nodes, and the UP entities are shown within a combined UP node (the "combo UPF+SAEGW-U" node) 81, "SAEGW-U" being an acronym for System Architecture Evolution Gateway User Plane. In this example, the combined UP node 81 is shown as including SGW-U, PGW-U and TDF-U for 4G, and UPF for 5G. Although both 4G and 5G UP entities are shown as included in the same UP node 81, this is purely an example, and the 4G UP entities may be in a node different from the 5G UP node. In the example shown in FIG. 10, during handover from 4G to 5G, if AMF determines that the particular SMF selected by MME (e.g., combination SMF+PGW-C node 801) cannot serve the UE location, AMF shall insert a new SMF. In such a case, the different UP entities (e.g., I-UPF, ULCL/BP, PSA1 and/or PSA2) can be in the same node. There is no need for the intermediate N9 circuits (e.g., between PSA1 and I-UPF; between I-UPF and ULCL/BP; and between PSA2 and ULCL/BP. The downlink user plane traffic is routed directly through the N6 interface entering the combined UP node 81, subjected to the processing as per the rules specified by the CP entities and installed over N4 interfaces, and then routed through the N3 interface to the 5G RAN, as shown in FIG. 9. Similarly, the uplink user plane traffic is routed through the N3 interface, subjected to the processing as per the rules specified by the CP entities and installed over N4 interfaces, and then routed through the N6 interfaces (e.g., to DNN A or DNN B). In this manner, the UP dispenses with the intermediate interface circuits (i.e., the multiple N9 circuits), thereby achieving optimized user plane data stream handling and cost savings. However, the CP entities will presume that the N9 intermediate interface circuits exist, and the combined UP node 81 utilizes the Terminal Endpoint Identifiers (TEIDs) associated with the intermediate paths (which are not actually provided and used in user plane data stream handling in this example) in Packet Forwarding Control Protocol (PFCP) response messages.

In accordance with the example embodiments, in the case of 4G network operation and/or handover from 5G network to 4G network operation, the session handling process module (e.g., SHP module 310 shown in FIGS. 3-5 and 8-9) of the combined UP node optimizes the user plane data stream handling as described in detail below. The combined UP node (e.g., 31, 41 or 81) ascertains, e.g., using Session Handling Process (SHP) module 310, the SGW-U IP address and/or namespace, PGW-U IP address and/or namespace, and TDF-U IP address and/or namespace, e.g., for the allocated TEIDs for a given UE or Packet Data Network (PDN) connection (i.e., involving User Identification (ID) Information Element (IE) and Network Instance IE or Access Point Name (APN)/DNN IE combination) for a given PFCP Session.

If the IP addresses or the namespaces of SGW-U (4G Access Data Plane Node), PGW-U (4G Intermediate Data Plane Node) and TDF-U (4G Anchor Data Plane Node) are different, then the downlink connection and the uplink connection are handled in the following manner. For the downlink connection (between a service node and a RAN), the packets transmitted by the first interface (SGi) directly connecting the service node to the combined UP node (i.e., SGi interface connecting the service node to the TDF-U) are routed to a second interface located internally within the combined UP node (e.g., S5-U and/or S8-U interface), and the second interface (S5-U and/or S8-U) maps the packets to Tunnel Endpoint Identifier (TEID) associated with at least one third interface (e.g., S1-U and/or S12) directly connecting the combined UP node to the RAN. The second interface can also map the packets to TEID associated with a second SGi (e.g., between TDF-U and PGW-U shown in FIG. 4). For the uplink connection (between the RAN and a service node), packets transmitted by the at least one third interface (e.g., S1-U and/or S12) directly connecting the RAN to the combined UP node are routed to the second interface (S5-U and/or S8-U) located internally within the combined UP node, and the second interface (S5-U and/or S8-U) maps the packets to the first interface directly connecting the combined UP node to the service node (i.e., SGi connecting the service node to the TDF-U of the combined UP node). The second interface can also map the packets to TEID associated with the second SGi (e.g., between TDF-U and PGW-U shown in FIG. 4).

If the IP addresses or the namespaces of SGW-U (4G Access Data Plane Node), PGW-U (4G Intermediate Data Plane Node) and TDF-U (4G Anchor Data Plane Node) are the same, then the downlink connection and the uplink connection are handled in the following manner. For the downlink connection (between a service node and a RAN), the packets transmitted by the first interface (SGi) directly connecting the service node to the combined UP node (i.e., SGi connecting the service node to the TDF-U of the combined UP node) are routed directly to the at least one third interface (e.g., S1-U and/or S12) directly connecting the combined UP node to the RAN. The combined UP node stores (e.g., at the Session Handling Process Module, or at another location) at least one TEID of an intermediate path (e.g., S5-U and/or S8-U TEID shown in FIG. 4 but eliminated in FIG. 5) not utilized for the downlink connection, which TEID of the intermediate path is utilized in at least one Packet Forwarding Control Protocol (PFCP) response message. For the uplink connection (between the RAN and the service node), packets transmitted by the at least one third interface (e.g., S1-U and/or S12) directly connecting the RAN to the combined UP node are routed directly to the first interface directly connecting the combined UP node to the service node (e.g., SGi connecting the TDF-U of the combined UP node to the service node). The combined UP node stores (e.g., at the Session Handling Process Module, or at another location) at least one TEID of an intermediate path (e.g., S5-U and/or S8-U TEID shown in FIG. 4 but eliminated in FIG. 5) not utilized for the uplink connection, which TEID of the intermediate path is utilized in at least one Packet Forwarding Control Protocol (PFCP) response message.

In the case of 5G network operation and/or handover from 4G network to 5G network operation, the session handling process module (e.g., SHP module 310 shown in FIGS. 3, 6, 7 and 10) of the combined UP node optimizes the user plane data stream handling as described in detail below. The combined UP node (e.g., 31, 61 or 81) ascertains, e.g., using Session Handling Process (SHP) module 310, the I-UPF IP address and/or namespace, PSA IP address and/or namespace, and the ULCL/BP IP address and/or namespace for the allocated TEIDs for a given Packet Data Unit (PDU) Session (i.e., involving User ID IE and Network Instance IE or APN/DNN IE combination) for a given PFCP Session.

If the IP addresses or the namespaces of the I-UPF (5G Intermediate Data Plane Node), PSA (5G Anchor Data Plane Node), and the ULCL/BP (5G Access Data Plane Node) are different, then the downlink connection and the uplink connection are handled in the following manner. For the downlink connection (between a service node and a RAN), the packets transmitted by the first interface (N6) directly connecting the service node (e.g., DNN A shown in FIG. 6) to the combined UP node (e.g., PSA1 of the combined UP node 61 shown in FIG. 6) are routed to a second interface located internally within the combined UP node (e.g., N9 interface between I-UPF and ULCL/BP), and the second interface maps the packets to Tunnel Endpoint Identifier (TEID) associated with at least one third interface (e.g., N3) directly connecting the combined UP node to the RAN. The second interface can also map the packets to TEID associate with a second N9 interface (e.g., between I-UPF and PSA1 shown in FIG. 6). For the uplink connection (between the RAN and a service node), packets transmitted by the at least one third interface (e.g., N3) directly connecting the RAN to the combined UP node are routed to the second interface (e.g., N9 interface between ULCL/BP and I-UPF) located internally within the combined UP node, and the second interface (N9) maps the packets to the first interface directly connecting the combined UP node to the service node (e.g., N6 interface connecting the service node (DNN A) to the PSA1 of the combined UP node 61 shown in FIG. 6). The second interface can also map the packets to TEID associate with the second N9 interface (e.g., between I-UPF and PSA1 shown in FIG. 6). In the case of downlink and uplink connection between DNN B and the RAN (e.g., as shown in FIG. 6), the packets will be routed through the only intermediate interface path within the combined UP node, i.e., N9 interface between PSA2 and ULCL/BP.

If the IP addresses or the namespaces of the I-UPF (5G Intermediate Data Plane Node), PSA (5G Anchor Data Plane Node), and the ULCL/BP (5G Access Data Plane Node) are the same, then the downlink connection and the uplink connection are handled in the following manner. For the downlink connection (between a service node and a RAN), the packets transmitted by the first interface (N6) directly connecting the service node (e.g., DNN A shown in FIG. 7) to the combined UP node (e.g., PSA1 of the combined UP node 61 shown in FIG. 7) are routed directly to the at least one third interface (e.g., N3) directly connecting the combined UP node to the RAN. The combined UP node stores (e.g., at the Session Handling Process Module, or at another location) at least one TEID of an intermediate path (e.g., N9 interface between ULCL/BP and I-UPF, and/or N9 interface between I-UPF and PSA1 shown in FIG. 6) not utilized for the downlink connection, which TEID of the intermediate path is utilized in at least one Packet Forwarding Control Protocol (PFCP) response message. For the uplink connection (between the RAN and the service node), packets transmitted by the at least one third interface (e.g., N3) directly connecting the RAN to the combined UP node are routed directly to the first interface (N6) directly connecting the combined UP node to the service node (e.g., N6 interface connecting the service node (DNN A) to the PSA1 of the combined UP node 61 shown in FIG. 7). The combined UP node stores (e.g., at the Session Handling Process Module, or at another location) at least one TEID of an intermediate path (e.g., N9 interface between ULCL/BP and I-UPF, and/or N9 interface between I-UPF and PSA1) not utilized for the downlink connection, which TEID of the intermediate path is utilized in at least one Packet Forwarding Control Protocol (PFCP) response message. In the case of downlink and uplink connection between DNN B and the RAN (e.g., as shown in FIGS. 6 and 7), the only intermediate interface path within the combined UP node (which intermediate interface path is eliminated and not utilized) is N9 interface between PSA2 and ULCL/BP, so the combined UP node will store and utilize the TEID of this intermediate interface path (not utilized for the downlink and uplink connection) in at least one PFCP response message.

The techniques and embodiments described herein are exemplary, and should not be construed as implying any specific limitation on the present disclosure. It should be understood that various alternatives, combinations and modifications could be devised by those skilled in the art. For example, steps associated with the processes described herein can be performed in any order, unless otherwise specified or dictated by the steps themselves. The above description is illustrative, and is not intended to be restrictive. One of ordinary skill in the art may make numerous modifications and/or changes without departing from the general scope of the disclosure.

Although the present disclosure utilizes 4G and 5G network operations as examples, these examples are not limiting. In addition, and as has been described, the above-described embodiments (and/or aspects thereof) may be used in combination with each other. Additionally, portions of the above-described embodiments may be removed without departing from the scope of the disclosure. In addition, modifications may be made to adapt a particular situation or material to the teachings of the various embodiments without departing from their scope. Many other embodiments will also be apparent to those of skill in the art upon reviewing the above description. The present disclosure is intended to embrace all such alternatives, modifications and variances that fall within the scope of the appended claims.

Some embodiments may be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

Glossary of Terms

5G(C) 5$^{th}$ Generation (Core) Network
5GS 5$^{th}$ Generation System
AF Application Function
AMF Access and Mobility Management Function
AUSF Authentication Server Function
BP Branching Point
CP Control Plane
DN Data Network
DPI Deep Packet Inspection
GGSN Gateway GPRS Support Node
GPRS General Packet Radio Service
ICMP Internet Control Message Protocol
I-UPF Intermediate User Plane Function
LMF Location Management Function
MME Mobility Management Entity
MTU Maximum Traffic Unit
NEF Network Exposure Function
NF Network Function
NG-RAN Next Generation Radio Access Network
NMAP Network Mapper
Nnrf Service-based interface exhibited by NRF
NRF Network Repository Function
NSSF Network Slice Selection Function
PCF Policy Control Function
PDU Packet Data Unit
PFCP Packet Forwarding Control Protocol
PGW Packet Gateway
PSA Packet Data Unit (PDU) Session Anchor
RAN Radio Access Network
SAEGW System Architecture Evolution Gateway
SGW Serving Gateway
SMF Session Management Function
TDF Traffic Detection Function
TEID Terminal Endpoint Identifier
UDM Unified Data Management
UE User Equipment
UL Uplink
ULCL Uplink Classifier
UPF User Plane Function

What is claimed is:

1. A method of optimizing user plane data stream for at least one of a 4G and 5G network operation involving at least one combined User Plane (UP) node comprising an access data plane node, an intermediate data plane node, an anchor data plane node, and a session handling process module, the method comprising:
ascertaining, by the session handling process module, one of Internet Protocol (IP) addresses or namespaces of the access data plane node, the intermediate data plane node, and the anchor data plane node corresponding to Tunnel Endpoint Identifier (TEIDs) assigned for a Packet Forwarding Control Protocol (PFCP) session;
if the IP addresses or the namespaces of the access data plane node, the intermediate data plane node, and the anchor data plane node are different,
for a downlink connection between a service node and a Radio Access Network (RAN), packets transmitted by a first interface directly connecting the service node to the at least one combined UP node are routed to a second interface located internally within the at least one UP node, and the second interface maps the packets to at least one Tunnel Endpoint Identifier (TEID) associated with at least one third interface directly connecting the at least one combined UP node to the RAN, and
for an uplink connection between the RAN and the service node, packets transmitted by the at least one third interface directly connecting the RAN to the at least one combined UP node are routed to the second interface located internally within the at least one combined UP node, and the second interface maps the packets to the first interface directly connecting the at least one combined UP node to the service node;
if the IP addresses or the namespaces of the access data plane node, the intermediate data plane node, and the anchor data plane node are the same,
for a downlink connection between the service node and the RAN, packets transmitted by the first interface directly connecting the service node to the at least one combined UP node are routed directly to the at least one third interface directly connecting the at least one combined UP node to the RAN, and the at least one combined UP node stores at least one TEID of an intermediate path not utilized for the downlink connection, and
for an uplink connection between the RAN and the service node, packets transmitted by the at least one third interface directly connecting the RAN to the at least one combined UP node are routed directly to the first interface directly connecting the at least one combined UP node to the service node, and the at least one combined UP node stores at least one TEID of an intermediate path not utilized for the uplink connection.

2. The method of claim 1, wherein for at least one of 4G network operation and handover from 5G network to 4G network operation, the access data plane node is Serving Gateway User Plane (SGW-U) node, the intermediate data plane node is Packet Gateway User Plane (PGW-U) node, and the anchor data plane node is Traffic Detection Function User Plane function (TDF-U) node.

3. The method of claim 2, wherein the first interface directly connecting the service node to the at least one combined UP node is an SGi interface, the second interface located internally within the at least one combined UP node is at least one of S5-U interface and S8-U interface, and the at least one third interface directly connecting the at least one combined UP node to the RAN is at least one of S1-U interface and S12 interface.

4. The method of claim 3, wherein at least one of S5-U interface and S8-U interface is the intermediate path not utilized for the downlink and the uplink connection in the case the IP addresses or the namespaces of the access data plane node, the intermediate data plane node, and the anchor data plane node are the same.

5. The method of claim 4, further comprising:
utilizing, by the at least one combined UP node, the at least one TEID of the intermediate path not utilized for the downlink and uplink connection, in at least one Packet Forwarding Control Protocol (PFCP) response message, if the IP addresses or the namespaces of the access data plane node, the intermediate data plane node, and the anchor data plane node are the same.

6. The method of claim 1, wherein for at least one of 5G network operation and handover from 4G network to 5G network operation, the access data plane node is at least one of Uplink Classifier (ULCL) node and a Branching Point (BP) node, the intermediate data plane node is an Intermediate User Plane Function (I-UPF) node, and the anchor data plane node is Packet Data Unit Session Anchor (PSA) node.

7. The method of claim 6, wherein the first interface directly connecting the service node to the at least one combined UP node is an N6 interface, the second interface located internally within the at least one combined UP node is an N9 interface, and the at least one third interface directly connecting the at least one combined UP node to the RAN is an N3 interface.

8. The method of claim 7, wherein an N9 interface is the intermediate path not utilized for the downlink and the uplink connection in the case the IP addresses or the namespaces of the access data plane node, the intermediate data plane node, and the anchor data plane node are the same.

9. The method of claim 8, further comprising:
utilizing, by the at least one combined UP node, the at least one TEID of the intermediate path not utilized for the downlink and uplink connection, in at least one Packet Forwarding Control Protocol (PFCP) response message, if the IP addresses or the namespaces of the access data plane node, the intermediate data plane node, and the anchor data plane node are the same.

10. The method of claim 5, wherein the session handling process module of the at least one combined UP node utilizes the at least one TEID of the intermediate path not utilized for the downlink and uplink connection, in at least one Packet Forwarding Control Protocol (PFCP) response message, if the IP addresses or the namespaces of the access data plane node, the intermediate data plane node, and the anchor data plane node are the same.

11. A system comprising:
at least one combined User Plane (UP) node configured to optimize user plane data stream handling for at least one of a 4G and 5G network operation, the at least one combined UP node including an access data plane node, an intermediate data plane node, an anchor data plane node, and a session handling process module;
wherein the session handling process module is configured to:
 ascertain one of Internet Protocol (IP) addresses or namespaces of the access data plane node, the intermediate data plane node, and the anchor data plane node corresponding to Tunnel Endpoint Identifier (TEIDs) assigned for a Packet Forwarding Control Protocol (PFCP) session;
 if the IP addresses or the namespaces of the access data plane node, the intermediate data plane node, and the anchor data plane node are different,
  for a downlink connection between a service node and a Radio Access Network (RAN), packets transmitted by a first interface directly connecting the service node to the at least one combined UP node are routed to a second interface located internally within the at least one combined UP node, and the second interface maps the packets to at least one Tunnel Endpoint Identifier (TEID) associated with at least one third interface directly connecting the at least one combined UP node to the RAN, and
  for an uplink connection between the RAN and the service node, packets transmitted by the at least one third interface directly connecting the RAN to the at least one combined UP node are routed to the second interface located internally within the at least one combined UP node, and the second interface maps the packets to the first interface directly connecting the at least one combined UP node to the service node;
 if the IP addresses or the namespaces of the access data plane node, the intermediate data plane node, and the anchor data plane node are the same,
  for a downlink connection between the service node and the RAN, packets transmitted by the first interface directly connecting the service node to the at least one combined UP node are routed directly to the at least one third interface directly connecting the at least one combined UP node to the RAN, and the at least one combined UP node stores at least one TEID of an intermediate path not utilized for the downlink connection, and
  for an uplink connection between the RAN and the service node, packets transmitted by the at least one third interface directly connecting the RAN to the at least one combined UP node are routed directly to the first interface directly connecting the at least one combined UP node to the service node, and the at least one combined UP node stores at least one TEID of an intermediate path not utilized for the uplink connection.

12. The system of claim 11, wherein for at least one of 4G network operation and handover from 5G network to 4G network operation, the access data plane node is Serving Gateway User Plane (SGW-U) node, the intermediate data plane node is Packet Gateway User Plane (PGW-U) node, and the anchor data plane node is Traffic Detection Function User Plane function (TDF-U) node.

13. The system of claim 12, wherein the first interface directly connecting the service node to the at least one combined UP node is an SGi interface, the second interface located internally within the at least one combined UP node is at least one of S5-U interface and S8-U interface, and the at least one third interface directly connecting the at least one combined UP node to the RAN is at least one of S1-U interface and S12 interface.

14. The system of claim 13, wherein at least one of S5-U interface and S8-U interface is the intermediate path not utilized for the downlink and the uplink connection in the case the IP addresses or the namespaces of the access data plane node, the intermediate data plane node, and the anchor data plane node are the same.

15. The system of claim 14, wherein the at least one combined UP node utilizes the at least one TEID of the intermediate path not utilized for the downlink and uplink connection, in at least one Packet Forwarding Control Protocol (PFCP) response message, if the IP addresses or the namespaces of the access data plane node, the intermediate data plane node, and the anchor data plane node are the same.

16. The system of claim 11, wherein for at least one of 5G network operation and handover from 4G network to 5G network operation, the access data plane node is at least one of Uplink Classifier (ULCL) node and a Branching Point (BP) node, the intermediate data plane node is an Intermediate User Plane Function (I-UPF) node, and the anchor data plane node is Packet Data Unit Session Anchor (PSA) node.

17. The system of claim 16, wherein the first interface directly connecting the service node to the at least one combined UP node is an N6 interface, the second interface located internally within the at least one combined UP node is an N9 interface, and the at least one third interface directly connecting the at least one combined UP node to the RAN is an N3 interface.

18. The system of claim 17, wherein an N9 interface is the intermediate path not utilized for the downlink and the uplink connection in the case the IP addresses or the namespaces of the access data plane node, the intermediate data plane node, and the anchor data plane node are the same.

19. The system of claim 18, wherein the at least one combined UP node utilizes the at least one TEID of the intermediate path not utilized for the downlink and uplink connection, in at least one Packet Forwarding Control Protocol (PFCP) response message, if the IP addresses or the namespaces of the access data plane node, the intermediate data plane node, and the anchor data plane node are the same.

20. The system of claim 15, wherein the session handling process module of the at least one combined UP node utilizes the at least one TEID of the intermediate path not utilized for the downlink and uplink connection, in at least one Packet Forwarding Control Protocol (PFCP) response message, if the IP addresses or the namespaces of the access data plane node, the intermediate data plane node, and the anchor data plane node are the same.

* * * * *